United States Patent [19]

Ebara et al.

[11] 4,080,289
[45] Mar. 21, 1978

[54] APPARATUS FOR TREATING WASTE WATER OR SOLUTION

[75] Inventors: Katsuya Ebara, Mito; Toshio Ogawa, Takahagi; Sankichi Takahashi; Sigeoki Nishimura, both of Hitachi; Seiichi Kikkawa, Katsuta; Shinji Komori; Toshio Sawa, both of Hitachi, all of Japan

[73] Assignee: Hitachi, Ltd. and Hitachi Plant Engineering and Construction Co., Ltd., Japan

[21] Appl. No.: 657,560

[22] Filed: Feb. 12, 1976

[30] Foreign Application Priority Data

Feb. 28, 1975 Japan .................................. 50-23921
Feb. 28, 1975 Japan .................................. 50-23923

[51] Int. Cl.$^2$ ....................... B01D 13/00; B01D 5/00; B01D 11/00
[52] U.S. Cl. .................................. 210/23 H; 210/52; 210/259; 210/55
[58] Field of Search ............ 210/23 H, 259, 44, 321 R

[56] References Cited

U.S. PATENT DOCUMENTS

| 3,677,405 | 7/1972 | Keith, Jr. | 210/71 |
| 3,795,317 | 3/1974 | Van Zun | 210/321 |
| 3,816,276 | 6/1974 | Ichiki et al. | 210/44 X |
| 3,819,513 | 6/1974 | Ishii et al | 210/23 H |
| 3,839,206 | 10/1974 | Welch | 210/259 |
| 3,883,431 | 5/1975 | Ishii et al. | 210/23 H X |
| 3,939,070 | 2/1976 | Roth | 210/23 H |

Primary Examiner—Frank A. Spear, Jr.
Assistant Examiner—David R. Sadowski
Attorney, Agent, or Firm—Craig & Antonelli

[57] ABSTRACT

A system is provided for separating waste water or solution into a permeated solution and a concentrated solution by feeding the waste water or solution to a reverse osmosis apparatus using a membrane.

A chemical pretreating apparatus is provided to prevent hard scales contained in the waste water or solution from precipitation during the concentration in the reverse osmosis apparatus using the membrane. An apparatus for charging sponge balls is further provided to mechanically remove suspended solids and other suspended matters, that is, soft scales when deposited on the surface of membrane. The sponge balls are desirably recyclically used.

35 Claims, 16 Drawing Figures

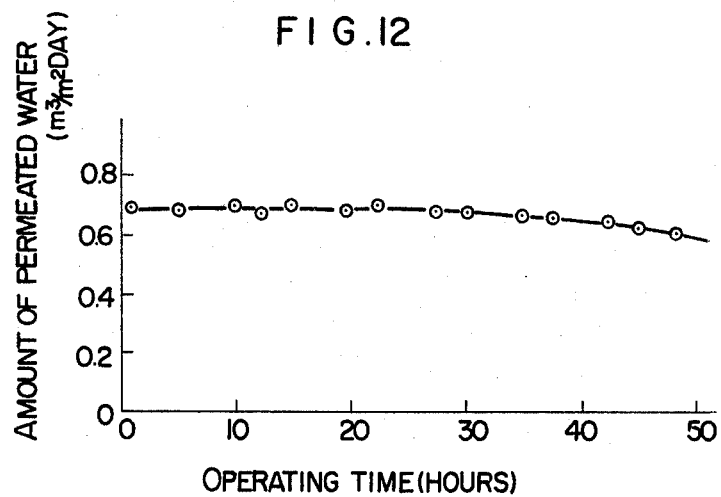
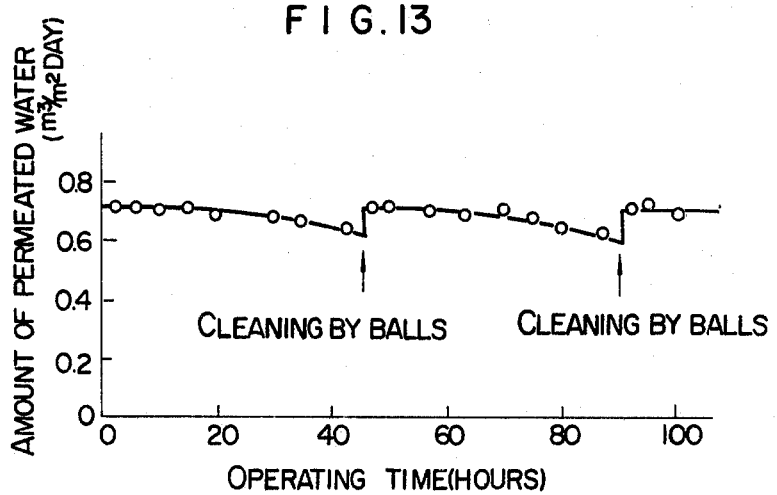

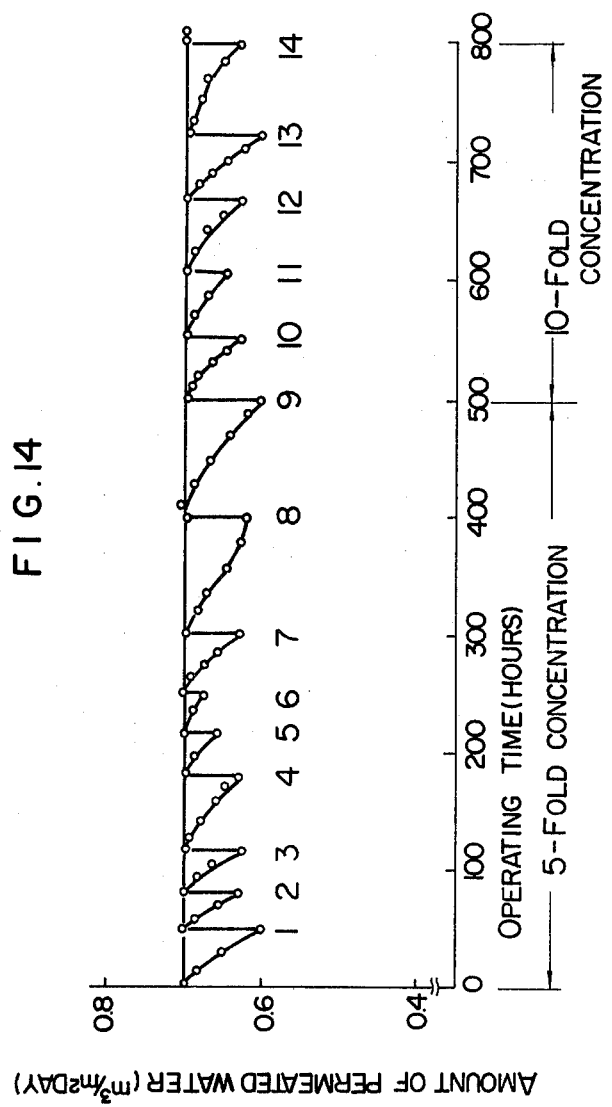

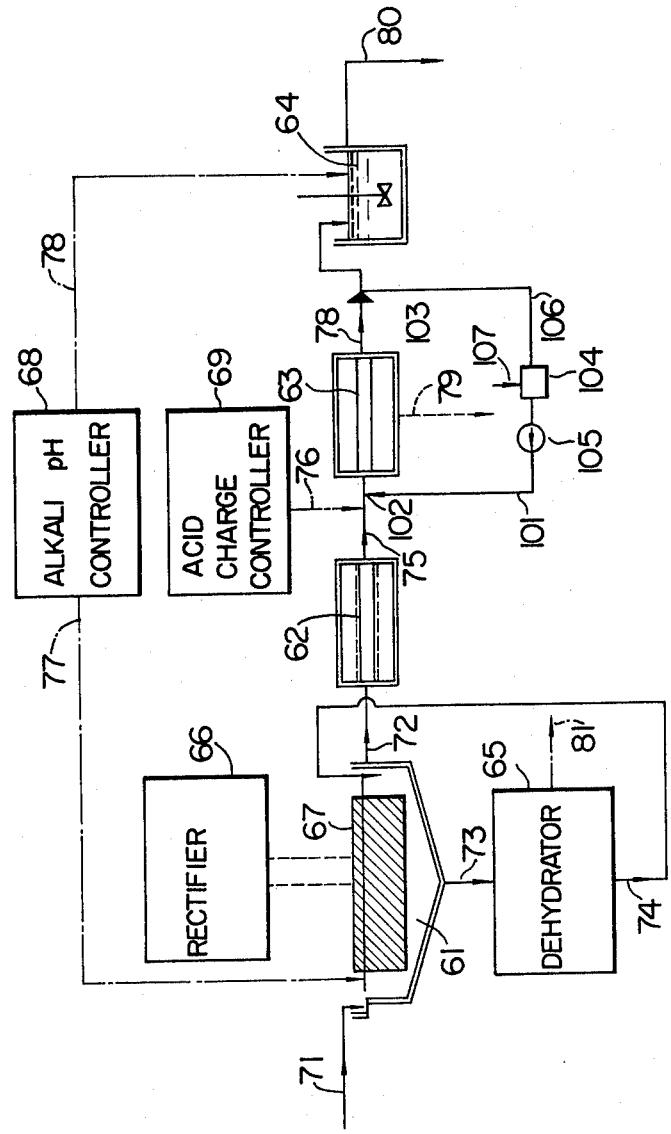

APPARATUS FOR TREATING WASTE WATER OR SOLUTION

This invention relates to a treatment of waste water or solution, especially industrial waste water, by membrane process, and provides a method for treating scales and suspended materials precipitated or settled on the surface of semi-permeable membrane.

In desalting and purification of waste water or solution by reverse osmosis, impure water is brought in contact with a semi-permeable membrane, and a pressure in excess of the osmotic pressure of the impure water is applied to the impure water. It is known that an osmotic pressure to, for example, the sea water is about 24.5 kg/cm$^2$, and thus a pressure difference in excess of 24.5 kg/cm$^2$ must be maintained across a membrane. In this manner it is possible to desalt or purify the waste water or solution by reverse osmosis, whereby permeated water is obtained on one hand, and an aqueous concentrated solution is obtained on the other hand. However, such reverse osmosis contains the following problem. That is, the solute, which is initially in a dissolution state because the solute is at a concentration below its saturated concentration, is gradually concentrated to more than the saturated concentration in a reverse osmosis apparatus and settled and deposited on the surface of reverse osmosis membrane. As a result, the membrane is deteriorated and damaged. Typical compounds that are very liable to be deposited as scales are insoluble salts such as calcium sulfate ($CaSO_4$), calcium carbonate ($CaCO_3$), calcium fluoride ($CaF_2$) contained in waste water resulting from a calcium treatment of waste water containing fluorine, etc.

When scales such as $CaSO_4$, $CaCO_3$ or $CaF_2$ is formed on the surface of reverse osmosis membrane, an amount of permeated water is extremely decreased and ultimately the apparatus is clogged by the growing scales.

The insoluble salts acting as a principal factor in the scale formation are almost unexceptionally contained when a treatment of removing harmful materials from industrial waste water mainly containing inorganic ions is carried out. When further treatment of such industrial waste water is carried out by reverse osmosis, or when permeated water is obtained from an aqueous suspension by reverse osmosis, it is necessary to establish a method for preventing the insoluble salts from deposition.

Explanation will be made, for example, of waste water containing fluorine, Heretofore, calcium salts [$Ca(OH)_2$, etc.] have been usually used to fix fluorine in the treatment of waste water containing fluorine, whereby the calcium salts have been separated and removed as calcium fluoride. However, in that method, it is difficult to reduce fluorine ions to less than 8 ppm owing to the solubility product of calcium fluoride. (The solubility of $CaF_2$ is about 16 ppm). When waste water containing 8 ppm of fluorine ions is concentrated in a reverse osmosis apparatus, $CaF_2$ scales are deposited on the surface of semi-permeable membrane.

In the treatment of waste water or solution in a reverse osmosis apparatus, it is important, in addition to said prevention of scale deposition, to prevent components fouling the surface of a membrane, contained in waste water, from settling and deposition, depending upon the nature or state of waste water or solution. The fouling components include the so called suspended materials or suspended solids (SS) such as metal hydroxides, organic colloid, and algae.

Since an art of preventing scales from deposition on the surface of a membrane and an art of removing foulding materials from the surface of a membrane have not been so far established, a practical application of reverse osmosis has been delayed, though the reverse osmosis has been regarded as a leading technique for desalting and purification these years.

An object of the present invention is to provide an apparatus for treating waste water or solution capable of preventing impure materials from deposition and accumulation on the surface of semipermeable membrane in separating waste water or solution into permeated water and an aqueous concentrated solution, using a semi-permeable membrane, thereby assuring a continuous operation.

Another object of the present invention is to provide an apparatus for treating waste water or solution capable of preventing insoluble salts from formation as scales on the surface of membrane.

Other object of the present invention is to provide an apparatus for treating waste water or solution capable of preventing scale deposition on the surface of reverse osmosis membrane, and cleaning and removing suspended materials settled and deposited on the surface of the membrane.

Still other object of the present invention is to provide an apparatus for treating waste water or solution ensuring a stable operation by a novel combination of chemical and mechanical means.

The present invention will be described, referring to the accompanying drawings.

FIGS. 11 to 14 are graphs showing results of tests conducted in a reverse osmosis apparatus to confirm the effect of the present invention.

FIGS. 15 and 16 are flow diagrams of other embodiments of the present invention.

Aluminum salt is dissociated to aluminate ions or aluminum ions in an aqueous solution, depending upon pH, and the ions can form soluble fluorine complexes or insoluble hydroxyfluorine complexes in the reaction with fluorine ions in accordance with its proportion. By adding an appropriate amount of $Al^{3+}$ to waste water or solution, effecting reaction of aluminum ions with fluorine ions in the waste water or solution, thereby forming soluble complex ions in the form of $AlF_6^{3-}$ and feeding the waste water or solution in that state into a reverse osmosis apparatus using membranes, deposition of $CaF_2$ scales can be prevented.

Figure 1:
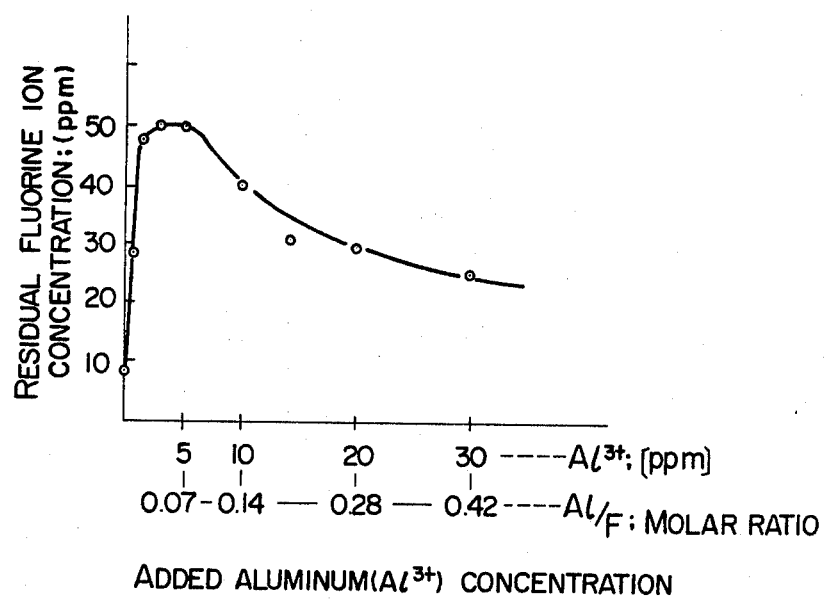
FIG. 1 is a graph showing test results regarding relations between concentrations of added $Al^{3+}$ and concentrations of residual dissolved $F^-$.
Figure 2:
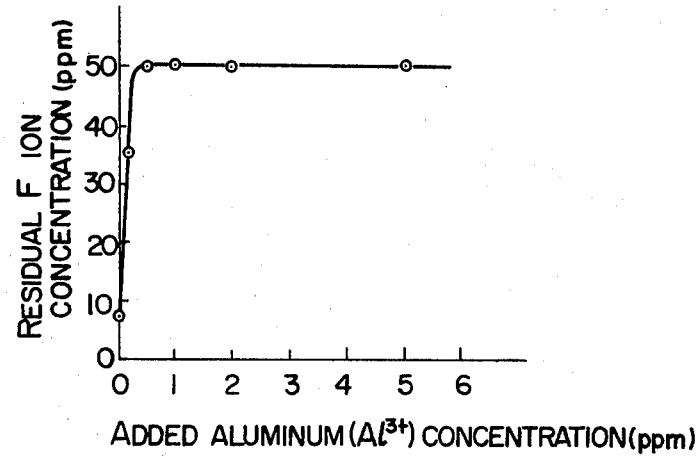
FIG. 2 is a partially enlarged graph of FIG. 1 showing the test results.
Figure 3:
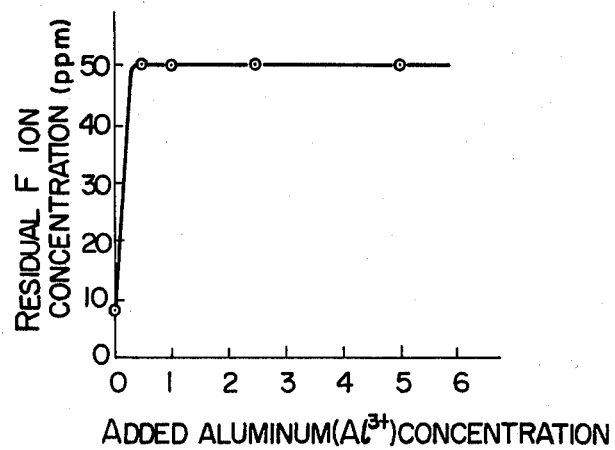
FIG. 3 is a graph showing similar test results to those of FIG. 1.

In FIGS. 1 to 3, results of test of reaction of aluminum ions with fluorine ions to form complexes are shown, where concentrations of $Al^{3+}$ are plotted on the abscissa and concentrations of residual dissolved fluorine ions are plotted on the ordinate. FIG. 2 shows a partially enlarged view of FIG. 1.

In FIGS. 1 and 2, a sample solution having a fluorine concentration, $F^- = 50$ ppm, and a calcium concentration, $Ca^{2+} = 250$ ppm, is adjusted to pH 7, and aluminium sulfate, $Al_2(SO_4)_3 \cdot 18H_2O$, is added to the sample solution as the aluminum salt in a range of the concentration in terms of aluminum ions, $Al^{3+} = 0$ to 30 ppm. Results obtained by reaction conducted for about 30 minutes with stirring are shown.

In FIG. 3, a sample solution whose calcium concentration is $Ca^{2+} = 50$ ppm is shown.

When no aluminum salt is added, calcium fluoride is formed by reaction of calcium ions with fluorine ions, and the fluorine ions are removed to about 8 ppm. $CaF_2$ is settled and precipitated as crystals.

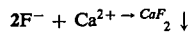

$$2F^- + Ca^{2+} \rightarrow CaF_2 \downarrow$$

Then, the residual dissolved fluorine concentration is once abruptly returned to the initial fluorine concentration of 50 ppm in accordance with the amount of added aluminum salt, and then is gradually decreased. These phenomena indicate that soluble higher complexes are formed in the order of initial $AlF^{2+}$, $AlF_2^+$, ........ to $AlF_6^{3-}$ in accordance with the amount of added aluminum salt, and ultimately mononucleate or polynucleate products of hydroxyfluorine complexes such as $Al(OH)_2F$ are formed, and the fluorine ions are fixed thereto owing to the insolubility of said products. By addition of an appropriate amount of $Al^{3+}$, the reaction, $2F^- Ca^{2+} \rightarrow CaF_2 \eta$ never takes place, and no crystals are deposited.

Therefore, even if the fluorine ion ($F^-$) concentration is increased to over 8 ppm by reverse osmosis, no crystals of $CaF_2$ are deposited, and no scales are formed on the surface of membrane. That is, the formation of scales on the surface of membrane can be prevented.

It is seen that a molar ratio of aluminum ions to fluorine ions, which determines the formation of insoluble or soluble complexes, lies at $Al/F$ = about 0.1. Therefore, it is desirable that the suppression of scale formation is carried out practically at $Al/F$ = not more than 0.1, and the fluorine fixation practically at $AL/F$ = not less than 0.5. In the actual operation, the amount of aluminum must be determined in view of reaction conditions and properties of waste water or solution. Besides the aluminum ions, irons ions filings are also useful for the formation of insoluble complexes.

Scales of $CaF_2$, etc. can be prevented from deposition onto the surface of reverse osmosis membrane from the waste water or solution thereby.

It is also necessary to take steps to remove the suspended materials already deposited from the waste water or solution onto the surface of the membrane. According to the present invention, the deposited fouling materials are removed by mechanically scraping the surface of the membrane with elastic materials such as sponge balls, etc. to clear and remove the fouling materials on the surface of the membrane, and the surface of the membrane can be cleaned thereby. The use of the elastic materials can remove not only the fouling materials, but also scales of the residual calcium fluoride, etc. when deposited on the surface of the membrane. As the sponge balls, balls of urethane foam can be used, but the sponge balls are not limited thereto. The reverse osmosis apparatus suitable for the cleaning by sponge balls is a tubular or cylindricaal type reverse osmosis apparatus using a semi-permeable membrane prepared in a tubular or cylindrical configuration. Desirable shape of the sponge balls is spherical, but the shape is not limited thereto. Suitable size of the sponge balls is a little larger than the diameter of tubular type semi-permeable membrane, but the sponge balls of smaller sizes than the diameter of the tubular membrane can sufficiently satisfy the desired object.

Figure 4:
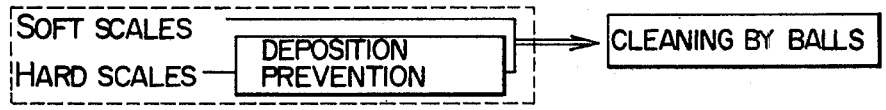
FIGS. 4 and 5 are schematic flow diagrams illustrating the present invention.

Thus, it is desirable that hard scale components contained in the waste water or solution are treated as the steps to prevent the fouling of the surface of the membrane, as shown in FIG. 4, the deposition in the reverse osmosis apparatus is made as small as possible thereby, and the pretreated water or solution is passed through the reverse osmosis apparatus together with the elastic materials such as sponge balls (the sponge balls can be added to the waste water or solution in advance, depending upon situations), thereby cleaning the deposited scales by the sponge balls. A continuous operation is made possible in the reverse osmosis apparatus thereby. An advantage of the ball cleaning by the addition of the sponge balls is a facilitation of the pretreatment, and the treating operation is made possible free from any troubles without applying a strict pretreatment of the waste water or solution. Ball cleaning is also possible even during the continuous operation, and thus an operating efficiency can be elevated.

Besides the reverse osmosis apparatus, an ultrafiltration apparatus and an electrodialysis apparatus are known as the apparatus using a membrane, and the present invention is also applicable to these apparatuses.

The present invention is based on the foregoing findings, and provides an apparatus for treating waste water or solution in a system for introducing the waste water or solution into a membrane separator and separating it into permeated water and an aqueous concentrated solution, characterized by comprising a means of adding aluminum to the waste water or solution as a pretreatment, thereby forming soluble complexes through combination of the aluminum with scale components contained in the waste water or solution, and a means of introducing the waste water or solution into the membrane separator after the formation of said soluble complexes.

Furthermore, the present invention provides an apparatus which comprises a raw water tank, a first reaction vessel connected to the raw water tank and being directed to formation of insoluble complexes by combining aluminum added with scale components contained in waste water or solution, a separation vessel for separating the formed insoluble complexes from the waste water or solution, a second reaction vessel directed to formation of soluble complexes by combining aluminum then added with remaining scale components still contained in the waste water or solution, and a membrane separation device for the pretreated waste water and solution.

Furthermore, the present invention provides a system for treating waste water or solution by reverse osmosis, wherein waste water or solution is introduced into a reverse osmosis apparatus using a membrane to separate the waste water or solution into permeated water and an aqueous concentrated solution, characterized by providing a pretreatment device for preventing hard scale components contained in the waste water or solution from deposition when concentrated, and passing the pretreated water or solution containing soft scale components, together with elastic materials such as sponge balls, etc. through the reverse osmosis apparatus using the membrane, thereby cleaning the surface of the membrane.

Still furthermore, the present invention provides a system for treating waste water or solution by reverse osmosis, characterized by adding aluminum or iron to waste water or solution to be introduced into a reverse osmosis apparatus using a membrane as a pretreatment, thereby forming soluble complex ions of hard scale components contained in the waste water or solution, and introducing elastic materials such as sponge balls into the resulting waste water or solution as such, thereby effecting cleaning the surface of the membrane with the elastic materials.

Still furthermore, the present invention provides a system for treating waste water or solution by reverse osmosis, characterized by comprising a first step of adding aluminum or iron to waste water or solution to be introduced into a reverse osmosis apparatus as a pretreatment, thereby forming insoluble complexes thereof with fluorine contained in the waste water or solution, and a second step of further adding aluminum to the pretreated waste water or solution, thereby forming soluble complexes thereof with remaining fluorine contained in the pretreated waste water or solution, and adding elastic materials such as sponge balls to the waste water or solution.

Still furthermore, the present invention provides an apparatus for treating waste water or solution by reverse osmosis, wherein waste water or solution is introduced into a reverse osmosis apparatus to remove impurities contained in the waste water or solution, characterized by comprising a tank for waste water or solution, a first reaction vessel connected with said tank and directed to formation of precipitates of the impurities by an additive added to the first reaction vessel, a separation tank for removing the precipitates, a second reaction vessel directed to formation of soluble materials of the remaining impurities by an additive added to the second reaction vessel, a device for charging elastic materials such as sponge balls to the waste water or solution, a reverse osmosis apparatus for the waste water or solution containing the soluble materials and suspended materials, and a device for recovering the elastic materials passed through the reverse osmosis apparatus.

Figure 5:
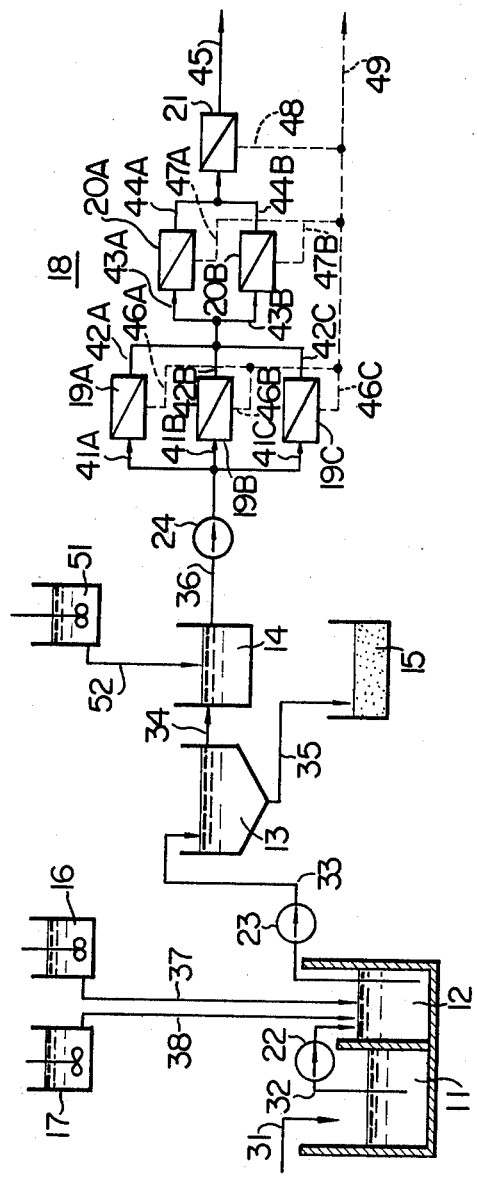

Embodiments of the present invention will be described, referring to the drawings. In FIG. 5, explanation is made of a treatment of waste water containing fluorine ions. Waste water is led to raw water tank 11 through raw water pipe 31, and stored in the tank. A portion of the waste water is led to reaction vessel 12 by pump 22 through pipe 32. Aluminum ions are led to reaction vessel 12 from Al storage tank 16 through pipe 37, and slaked lime to reaction vessel 12 from slaked lime slurry tank 17 through pipe 38. As an aluminum ion source, soluble aluminum salt, for example, aluminum sulfate, can be used. The waste water and aluminum ions placed in the first reaction vessel 12 are stirred by a stirrer (not shown in the drawing), and the fluorine ions react with the aluminum ions to form insoluble aluminum complexes. That is, the insoluble complexes are formed by controlling the amount of Al to an appropriate value as shown in FIGS. 1 to 3, as already explained above. The resulting waste water in a slurry state is then led to separation tank 13 by pump 23 through pipe 33, where the insoluble complexes are led, as sludges, to sludge storage tank 15 from the bottom of separation tank 13 through pipe 35. The sludges are stored in the sludge tank and then led to a secondary treatment system (not shown in the drawing). In supernatant waste water, the fluorine ions are fixed, so that the supernatant waste water contains about 8 ppm of fluorine ions. A secondary treatment may be carried out with phosphoric acid, etc. to further reduce the fluorine ion content of the supernatant waste water. The supernatant waste water containing the remaining fluorine ions is then led to second reaction vessel 14 through pipe 34. Aluminum ions are led to second reaction vessel 14 from Al storage tank 51 through pipe 52. It is appropriate to add 0.5 to 2.0 ppm of aluminum ions thereto. Practically, it has been found that a good result can be also obtained even by adding about 3.0 ppm, of aluminum ions thereto. Addition of aluminum ions in excess of about 3.0 ppm causes the aluminum ions to form hydroxides, such as $Al(OH)_3$, etc., bringing about such a trouble that successive reverse osmosis apparatus 18 cannot be sufficiently performed. By the addition of aluminum ions in the range as mentioned above, the remaining fluorine ions form soluble complexes with aluminum ions. The waste water brought into such a state is then led to reverse osmosis apparatus 18 by pump 24 through pipe 36. The reverse osmosis apparatus 18 consists of a combination of modules 19A, 19B, 19C, 20A, 20B and 21, each being provided with a semipermeable membrane inside.

In the embodiment of FIG. 5, a Christmas tree-type module arrangement is employed to reduce the number of modules in a direction toward the increasing concentration to make a flow speed uniform within the modules, but the present invention is not restricted to said arrangement. Pressure of the waste water is increased by pressure pump 24, and then the waste water is led to reverse osmosis modules 19A, 19B and 19C at the first stage through three branch pipes 41A, 41B and 41C. The waste water is concentrated in the modules, and the resulting concentrated waste water then flows into reverse osmosis modules 20A and 20B at the second stage through pipes 43A and 43B from pipes 42A, 42B and 42C. Permeated water in the modules at the first stage are withdrawn through pipes 46A, 46B and 46C. The concentrated waste water led to the modules at the second stage is likewise further concentrated, and then the concentrated waste water is taken out through pipes 44A and 44B, whereas permeated water is taken out through pipes 47A and 47B. Then, the concentrated waste water flows into reverse osmosis module 21 at the third stage, and is further concentrated therein. The concentrated waste water is ultimately taken out through pipe 45 and led to another treatment system (not shown in the drawing). Permeated water is taken out through pipe 48. All the permeated water is collected into pipe 49 and reused.

If suspended materials are contained in the waste water or solution in that case, they are deposited onto the surfaces of the membranes and foul the surfaces of the membrane. An embodiment of cleaning the surfaces of the membranes using a large number of elastic material, such as sponge balls is shown in FIG. 6.

Figure 6:
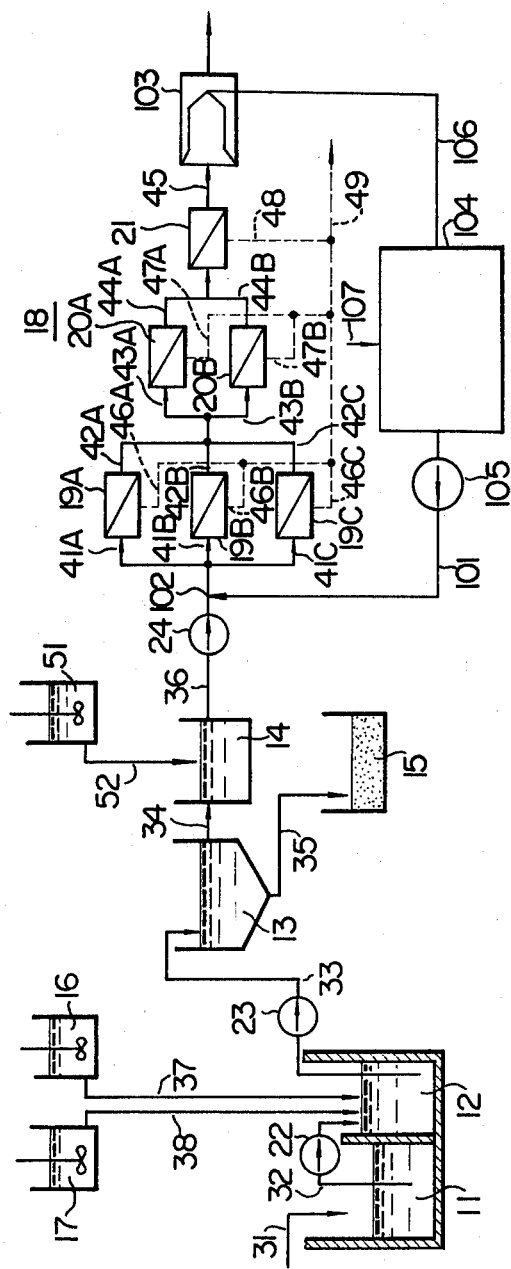
FIG. 6 is a schematic flow diagram showing one embodiment of the present invention.

FIG. 6 is identical to FIG. 5, except for a sponge ball recycle system, and thus no explanation is made of the identical members of the drawing. A large number of sponge balls are charged to pipe 36 at charge inlet 102. The sponge balls are led to sponge ball charger 104 through pipe 107 from a sponge ball storage tank (not shown in the drawings), and transferred to the charge inlet 102 by ball transfer pump 105 through pipe 101. Thus, the sponge balls flow through each of the modules together with the waste water or solution and scrape the surfaces of the membranes during the passage through the modules to scrape the deposited fouling materials off from the surfaces of the membranes, and perform a cleaning function. The sponge balls leaving the modules 21 at the last stage are recovered in sponge ball trap 103, and transferred to sponge charger 104 through pipe 106 for recycle.

Figure 7:
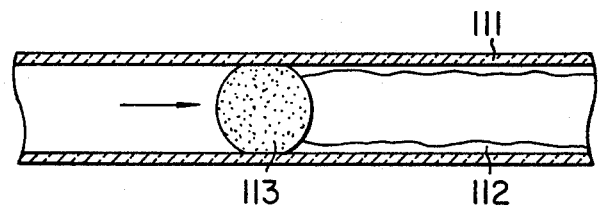
FIGS. 7 and 8 are schematic views showing part of FIG. 6 in detail.

FIG. 7 schematically shows a mode of removing the fouling materials deposited on the surface of tubular semi-permeable membrane by passing sponge balls along the surface of the membrane. Semi-permeable membrane 111 is shaped in a tubular form, and suspended materials 112 are deposited on the inside surface of semi-permeable membrane 111 (the side along which the raw waste water is passed), and foul the surface of the membrane. When sponge balls are passed inside the tubular membrane in an arrow direction, the sponge balls pass along the surface of the membrane in contact with the membrane, and thus the fouling materials such as deposited suspended materials, etc. are removed thereby. The surface of the semi-permeable membrane is cleaned by the passage of sponge balls therethrough.

Figure 10:
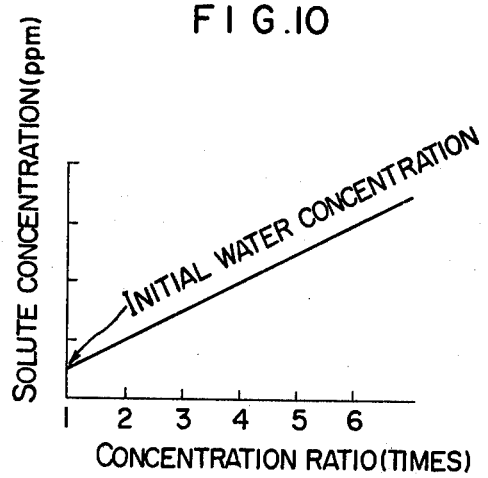
FIG. 10 is a graph of phenomena encountered in the reverse osmosis treatment, showing changes in concentration in a reverse osmosis module model-wise.

Solute concentration of waste water is increased at later stages of reverse osmosis modules. FIG. 10 shows relations between concentration ratio on the abscissa, and solute concentration of waste water on the ordinate, where the concentration ratio is a value represented by $Q_1/Q_2$, when a flow rate of the waste water at inlet is designated by $Q_1$ and a flow rate of concentrate waste water at outlet by $Q_2$. In the reverse osmosis process, the solute concentration is successively increased in the module, and thus solute dissolved in the waste water starts to deposit when the solute concentration of the waste water exceeds its solubility. However, the deposition of solute as so far encountered can be prevented by passing the waste water through a reverse osmosis apparatus after said soluble complexes have been formed. That is, it never appears at all or is a very rare case that the crystallized solute deposits on the surface of the membrane to form scales. For example, fluorine ions in the waste water react with $Al^{3+}$ by adding an appropriate amount of aluminum ions to the waste water to form a soluble complex ion such as $AlF_6^{5-}$, and deposition or settling of $CaF_2$ scales can be prevented thereby. Furthermore, any prolonged deposition of the fouling materials on the surface of the membrane can be prevented by charging the sponge balls.

Figure 8:
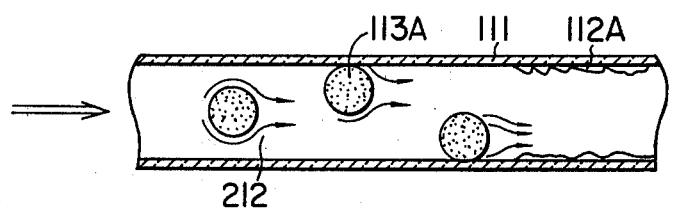

FIG. 8 schematically shows a mode of cleaning the surface of the membrane with small balls 113A. Scraped fouling materials are indicated by numeral 212. The use of balls ultimately promote generation of turbulent flow, and cause collisions, which help to scrape the deposited fouling materials off from the surface of the membrane.

Figure 9:
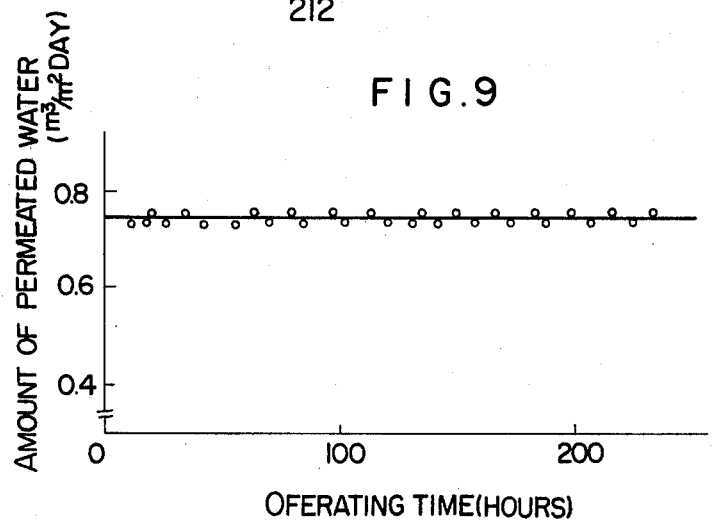
FIG. 9 is a graph showing an amount of permeated water when balls of small size are used.

FIG. 9 shows a result of study of whether a continuous circulation of small balls lowers an amount of permeated water, using a reverse osmosis apparatus with a tubular membrane of 25 m³/day or not. In the study, small balls having a diameter of 10 mm were used for the tubular membrane having an inside diameter of 12.5 mm. It is seen from FIG. 9 that the amount of permeated water is kept continuously constant.

To prove the effect of the present invention concretely, tests of treating waste water containing 7 ppm, of $F^{-1}$ and 50 ppm of $Ca^{2+}$ by reverse osmosis were carried out.

Figure 11:
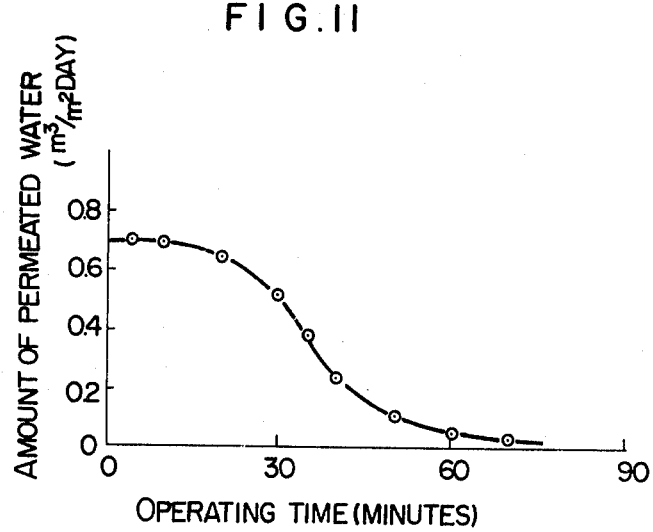

FIG. 11 shows changes of the amount of permeated water with time when said waste water containing fluorine ions and calcium ions was treated by reverse osmosis in a 5-fold concentration operation. It is seen from FIG. 11 that amount of permeated water is abruptly lowered about 30 minutes after the start of operation, and the permeated water is hardly obtained one hour after the start of operation. This is because the waste water containing 7 ppm of $F^-$ is concentrated by reverse osmosis, and as a result the $F^-$ concentration exceeds 8 ppm, that is, the solubility, $CaF_2$ resulting from the reaction of $F^-$ with $Ca^{2-}$ is deposited onto the surface of the membrane, and the amount of the deposited $CaF_2$ is increased with time, allowing the deposited $CaF_2$ to gradually grow over all the surface of the membrane. As the membrane is increasingly covered by $CaF_2$ deposited on the surface of the membrane, the amount of permeated water is decreased, and when almost all the surface of the membrane is covered by $CaF_2$, the amount of permeated water becomes almost zero. When scales such as $CaF_2$ are formed on the surface of the membrane, the reverse osmosis operation becomes impossible to carry out.

On the other hand, FIG. 12 shows changes of the amount of permeated water with time when the same waste water containing 7 ppm of $F^-$ and 50 ppm, of $Ca^{2+}$ as used in the case of the test for FIG. 11 was admixed with 2 ppm of $Al^{3+}$, and treated by reverse osmosis also in a 5-fold concentration operation. According to the results shown in FIG. 12, the amount of permeated water is lowered only by about 10 % about 45 hours after the start of operation, and no scales of $CaF_2$ are formed on the surface of the membrane. The reduction in the amount of permeated water by about 10 % for 45 hours is due to deposition of suspended materials contained in the waste water onto the surface of the membrane.

FIG. 13 shows test results of prolonged continuous operation when a 5-fold concentration operation and 10-fold concentration operation were carried out, where vertical arrow marks show the time of ball cleaning.

FIG. 14 shows test results of relations between the amount of permeated water and operating time when the same waste water was admixed with 2.0 ppm of $Al^{3+}$, and further charged with sponge balls, where cleaning of the surface of the membrane by sponge balls was carried out every about 45 hours after the start of operation. The amount of permeated water after the cleaning was completely recovered to that at the start of operation, and the effectiveness of cleaning by sponge balls was confirmed. When cleaning by sponge balls is carried out at every about 45 hours after the start of operation, the permeated water can be obtained in an almost constant amount. In FIG. 14, numerals 1 – 14 show the time of ball cleaning.

In the foregoing tests, $Al_2(SO_4)_3 \cdot 18H_2O$ was used as $Al^{3+}$, but any aluminum compounds capable of liberating $Al^{3+}$ can be used. Electrolytic aluminum can be also used.

Other embodiments of preventing $CaF_2$ deposition using the electrolytic aluminum will be described below.

Figure 15:
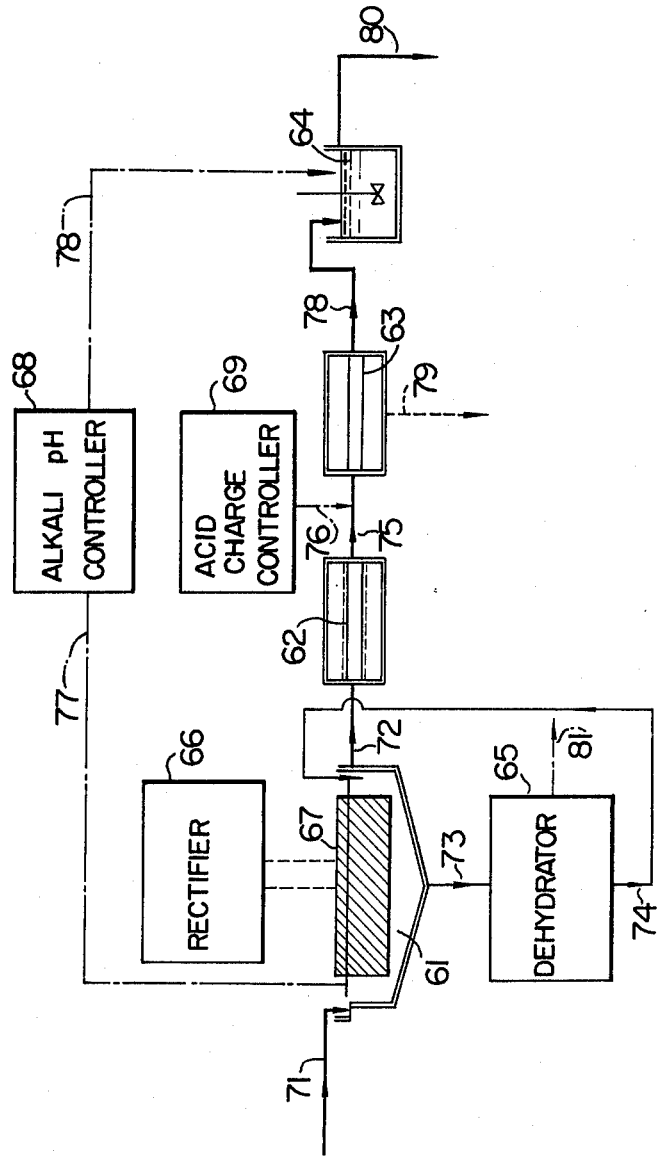

FIG. 15 shows one embodiment of the present invention, where a main system consists of electrolytic reaction vessel 61, micro-filter 62, reverse osmosis apparatus 63, concentrate-treating vessel 64 and dehydrator 65. Waste water containing fluorine ions is led to electrolytic reaction vessel 61 through pipe 71, which correspond to line 31 in FIGS. 5 and 6. A plurality of aluminum anode plates 67 connected to rectifier 66 are provided in parallel in electrolytic reaction vessel 61. Thus, electrolyzed aluminum ions are dissolvable from aluminum anode plates 67. The dissolved aluminum ions react with the fluorine ions in the waste water to form insoluble complexes, and the insoluble complexes are precipitated as flocs. The precipitates are led to dehydrator 74 through slurry discharge pipe 73, and dehydrated therein into sludge and filtrate water. The sludge is taken out of the dehydrator through sludge pipe 81, and the filtrate water is returned through pipe 74 to a treating water system of the electrolytic reaction vessel, for example, reaction vessel 61 shown in FIG. 15.

When the fluorine ion content of the waste water is reduced, and the residual fluorine ion concentration reaches a definite value in this manner, the rate of aluminum dissolution is made to reduce to form soluble complexes of the residual fluorine ions with the aluminum ions. That is, when the insoluble complexes are formed to fix the fluorine ions, it must be established, for example, that $Al/F = 0.5$ or more, and when the soluble complexes are formed, it must be established that $Al/F = 0.1$ or less. After the soluble complexes have been formed in the waste water in this manner, the waste water is led to microfilter 62 through pipe 72, and fine suspended components are removed from the waste water therein. Then, the thus treated waste water is led to reverse osmosis apparatus 63 through pipe 75, and desalted water is withdrawn through pipe 79, and concentrated waste water through pipe 78. The concentrated waste water is treated in concentrate treating vessel 64 by such operations as neutralization, separation, etc., depending upon the nature of the concentrated waste water, and then withdrawn through pipe 80.

In the system shown in FIG. 15, pH 5 – 8 is desirable for electrolytic reaction vessel 61 from the reaction viewpoint, and pH 5 or less is desirable for the reverse osmosis apparatus from the viewpoint of membrane properties. Therefore, an alkali pH controller 68 is connected to electrolytic reaction vessel 61 and concentrate treating vessel 64 through pipes 77 and 78, respectively, and an acid charge controller 69 is connected to reverse osmosis apparatus 63 through pipe 76.

Deposition of scales on the surfaces of reverse osmosis membrane can be prevented by charging aluminum ions generated by the electrolysis to the waste water and forming the soluble complexes.

FIG. 16 shows an embodiment of the present system having a sponge ball circulation system shown in FIG. 6, where the constituent members are identical with those of FIG. 6 for a sponge ball circulation system and FIG. 15 for other remaining members, and the whole system works similarly to that shown in FIG. 6 and FIG. 15. Thus, the constituent members have the numerals identical with those of FIG. 6 for the sponge ball circulation system and those of FIG. 15 for other members of the system, and have the identical functions. Thus, any explanation will not be required for the embodiment shown in FIG. 16.

In the foregoing embodiments, the fluorine ion fixation operation and desalting operation of waste water or solution containing fluorine ions, based on the combination of an aluminum electrolysis process with a reverse osmosis apparatus have been explained. In addition to the insoluble materials causing scale deposition in the reverse osmosis apparatus, rotten organic materials are sometimes contained in the waste water. In that case, it is possible to sterilize the waste water by providing an insoluble electrode in the electrolytic reaction vessel and generating a chlorine gas therein by the electrolysis of chlorides such as sodium chloride, etc.

According to the present invention, soluble complexes of the materials contained in waste water can be formed by adding an appropriate amount of additive thereto, and therefore when the waste water thus treated is led to a reverse osmosis apparatus to separate it into permeated water and concentrated waste water, scales are not settled and deposited on the surface of membrane. That is, the reverse osmosis system can be stably and continuously operated.

Furthermore, according to the present invention, membrane-fouling components such as suspended materials contained in waste water or solution can be removed by passing sponge balls along the surface of the membrane, and the surface of the membrane can be kept clean thereby. That is, the reverse osmosis system can be stably and continuously operated without any decrease in the amount of permeated water for a prolonged time.

What is claimed is:

1. An apparatus for treating waste water or solution containing fluoride and calcium in a system for introducing the waste water or solution into a membrane separation apparatus thereby to separate the waste water or solution into permeated liquid and concentrated liquid, which comprises a means for adding an additive comprising aluminum ions to the waste water or solution to be introduced into the membrane separation apparatus as a pretreatment of the waste water or solution, thereby forming soluble complexes of fluoride contained in the waste water or solution with the added aluminum ions, and a means for introducing the waste water or solution to the membrane separation apparatus after the formation of the soluble complexes.

2. An apparatus for treating waste water or solution containing fluoride and calcium, which comprises a raw water tank, a first reaction vessel connected to the raw water tank and directed to formation of insoluble complexes by combination of aluminum ions added with scale components contained in the waste water or solution from the raw water tank, a separation vessel directed to separation of the resulting insoluble complexes from the waste water or solution, a second reaction vessel directed to formation of soluble complexes of fluoride contained in the waste water or solution by combination of the remaining scale components comprising fluoride with the aluminum ions added, and a membrane separation apparatus for the thus pretreated waste water or solution.

3. An apparatus for treating waste water or solution according to claim 2, wherein a reverse osmosis apparatus using a membrane is used as the membrane separation apparatus.

4. An apparatus for treating waste water or solution according to claim 3, wherein the reverse osmosis apparatus using a membrane consists of a combination of modules, each containing a semi-permeable membrane inside, and number of the modules is decreased in a direction toward increasing concentration of said waste water or solution.

5. A method system for treating waste water or solution by reverse osmosis by introducing the waste water or solution containing fluoride and calcium into a reverse osmosis apparatus using a membrane, thereby separating the waste water or solution into permeated liquid and concentrated liquid, which comprises providing a pretreatment whereby a soluble complex comprising fluoride is formed thereby preventing deposition of hard scale components comprising calcium fluoride contained in the waste water or solution when the waste water or solution is concentrated, and passing the pretreated waste water or solution containing soft scale components and said soluble complex together with elastic materials through a reverse osmosis apparatus using a membrane, thereby cleaning surface of the membrane.

6. A method system according to claim 5, wherein aluminum ions are added as the pretreatment.

7. A method system according to claim 5, wherein ions are added as the pretreatment.

8. A method system according to claim 6, wherein an aluminum electrode plate is dissolved by electrolysis thereby providing the aluminum ions.

9. A method system according to claim 5, wherein the reverse osmosis apparatus using the membrane comprises at least one tubular module having a semipermeable membrane inside, and the elastic materials have a size larger than an inner diameter of the module.

10. A method system according to claim 5, wherein the reverse osmosis apparatus using the membrane comprises at least one tubular module having a semipermeable membrane inside, and the elastic materials have a size smaller than an inner diameter of the module.

11. A method system according to claim 5, wherein the elastic materials are continuously passed through the reverse osmosis apparatus.

12. An apparatus system for treating waste water or solution containing fluoride and calcium by reverse osmosis by passing the waste water or solution through a reverse osmosis apparatus, thereby removing impurities from the waste water or solution, which comprises a tank for the waste water or solution, a first reaction vessel connected to the tank and directed to formation of precipitates from impurities by adding aluminum ions to the vessel, a separation vessel for removing the precipitates, a second reaction vessel directed to formation of soluble complexes from residual impurities comprising fluoride ions by adding aluminum ions to the vessel, a device for charging elastic materials to the waste water or solution, and a reverse osmosis apparatus for the treated waste water or solution containing the soluble complexes.

13. An apparatus system according to claim 12, wherein a device for recovering the elastic materials passed through the reverse osmosis apparatus is provided.

14. An apparatus system according to claim 13, wherein a system for recycling the recovered elastic materials is provided.

15. An apparatus for treating fluoride and calcium ion containing waste water or solution in a system for providing said waste water or solution to a membrane separator for separating said waste water or solution into a permeated liquid and a concentrated liquid comprising
means for allowing aluminum ions added to said waste water or solution to form a soluble complex surprising said fluoride ions contained in said waste water or solution with said added aluminum ions thereby preventing deposition of hard scales of calcium fluoride on a membrane surface of said membrane separator, and
means for providing said waste water or solution containing said soluble complex to said membrane separator.

16. An apparatus according to claim 15, wherein said aluminum ions added to said means for allowing the formation of a soluble complex comprising fluoride and aluminum ions results in said waste water or solution having a molar ratio of said aluminum ions to said fluoride ions of not more than 0.1.

17. An apparatus according to claim 16, wherein said aluminum ions are added as a salt or as electrolytic aluminum ions.

18. An apparatus according to claim 15, further comprising means for charging an elastic material to said waste water or solution.

19. An apparatus for treating fluoride and calcium ion containing waste water or solution comprising:
(a) means for containing said waste water or solution;
(b) means for allowing the formation of an insoluble complex by combination of added aluminum ions and a fluoride scale component contained in said waste water or solution, said means for allowing the formation of an insoluble complex (b) being operatively connected to said means for containing said waste water or solution (a);
(c) means for separation of said insoluble complex from said waste water or solution, said means for separation (c) being operatively connected to said means (b);
(d) means for allowing the formation of a soluble complex comprising ionic aluminum and fluoride contained in said separated waste water or solution by combination of a remaining fluoride scale component with additional added aluminum ions, said means for allowing the formation of a soluble complex (d) being operatively connected to said means (c); and
(e) a membrane separation apparatus for separating into components said waste water or solution pretreated in the means of (b), (c) and (d) without the deposition of a hard scale of calcium fluoride on a membrane surface of said membrane separation apparatus.

20. An apparatus according to claim 19, wherein said membrane separation apparatus is a reverse osmosis apparatus.

21. An apparatus according to claim 20, wherein said reverse osmosis apparatus comprises a combination of modules, each of said modules comprising a tubular semi-permeable membrane, said combination of modules decreasing in number in a flow direction of said waste water or solution toward increasing concentration of said waste water or solution inside said tubular membranes of said reverse osmosis apparatus.

22. A method for treating soft scale component and fluoride and calcium ion-containing waste water or solution by reverse osmosis by providing said waste water or solution to a reverse osmosis apparatus comprising a semi-permeable membrane thereby separating said waste water or solution into a permeated liquid and a concentrated liquid comprising
  pretreating said waste water or solution with aluminum ions to form a soluble complex comprising ionic aluminum and fluoride which prevents deposition of a hard scale of calcium fluoride on an internal surface of said semi-permeable membrane when said waste water or solution is concentrated in said apparatus, and
  providing said pretreated waste water or solution containing said soft scale components and said soluble complex together with an elastic material to said reverse osmosis apparatus thereby preventing deposition of said hard scale on said membrane surface and cleaning said membrane surface of deposits of said soft scale component.

23. A method according to claim 22, wherein said elastic material is a plurality of sponge balls.

24. A method according to claim 22, wherein said pretreating step comprises adding an amount of aluminum ions not exceeding a molar ratio of aluminum ions to said fluoride ions of 0.1.

25. A method according to claim 24, wherein said aluminum ions are added in the form of a salt or as electrolytic aluminum ions.

26. A method according to claim 22, wherein said reverse osmosis apparatus comprises a tubular module containing an internal semi-permeable membrane, and said elastic material has a size larger than an inner diameter of said module.

27. A method according to claim 22, wherein said reverse osmosis apparatus comprises a tubular module containing an internal semi-permeable membrane, and said elastic material has a size smaller than an inner diameter of said module.

28. A method according to claim 22, wherein said elastic material is passed continuously through said reverse osmosis apparatus.

29. An apparatus for treating fluoride and calcium ion-containing waste water or solution by reverse osmosis by passing said waste water or solution through a reverse osmosis apparatus containing at least one semi-permeable membrane thereby removing an impurity from said waste water or solution comprising:
  (a) a container for said waste water or solution;
  (b) a first reaction vessel, operatively connected to said container (a), for allowing the formation of a precipitated impurity comprising fluoride ions by adding an additive comprising aluminum ions to said waste water or solution in said first reaction vessel;
  (c) a separation vessel, operatively connected to said first reaction vessel (b), for removing said precipitated impurity from a residual impurity comprising fluoride ions;
  (d) a second reaction vessel, operatively connected to said separation vessel (c), for allowing formation of a soluble complex comprising said fluoride ions of said residual impurity comprising fluoride ions by adding an additive comprising aluminum ions to said second reaction vessel;
  (e) a device for charging an elastic material to said waste water or solution comprising said soluble complex of second reaction vessel (d); and
  (f) a reverse osmosis apparatus, operatively connected to said second reaction vessel (d) and said device (e), for treating said waste water or solution containing said soluble complex and said elastic material.

30. An apparatus according to claim 29, further comprising a means for recovering said elastic material passed through said reverse osmosis apparatus.

31. An apparatus according to claim 30, wherein said elastic material is a plurality of sponge balls.

32. An apparatus according to claim 31, further comprising means for recycling said sponge balls.

33. An apparatus according to claim 29, wherein said additive added to said first reaction vessel (b) comprises aluminum ions in an amount not less than the molar ratio of aluminum ions to said fluoride ions of 0.5.

34. An apparatus according to claim 29, wherein said additive added to said second reaction vessel (d) comprises aluminum ions in an amount not more than the molar ratio of aluminum ions to said fluoride ions of 0.1.

35. A method for treating fluoride and calcium ion-containing waste water or solution by reverse osmosis by passing said waste water or solution through a reverse osmosis apparatus containing at least one semi-permeable membrane thereby removing impurities from said waste water or solution comprising:
  (a) treating said waste water or solution with an additive comprising aluminum ions which forms a precipitated insoluble complex comprising said fluoride ions;
  (b) separating said precipitated insoluble complex from said waste water or solution;
  (c) treating said waste water or solution of step (b) with an additive comprising aluminum ions which forms a soluble complex with residual fluoride ions;
  (d) charging an elastic material to said waste water or solution of step (c); and
  (e) providing said waste water or solution containing said soluble complex and said elastic material of step (d) to said reverse osmosis apparatus.

* * * * *